(12) United States Patent
Lee et al.

(10) Patent No.: US 8,156,127 B1
(45) Date of Patent: Apr. 10, 2012

(54) METHOD AND SYSTEM FOR DATA ARBITRATION

(75) Inventors: Young Choon Lee, Monroe, NJ (US); Oliver Winslow Selwyn, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 508 days.

(21) Appl. No.: 12/358,066

(22) Filed: Jan. 22, 2009

(51) Int. Cl.
*G06F 7/00* (2006.01)
*G06F 17/30* (2006.01)

(52) U.S. Cl. .................................. 707/748; 707/758

(58) Field of Classification Search .................. 707/748, 707/758
See application file for complete search history.

(56) References Cited

U.S. PATENT DOCUMENTS

| | | | |
|---|---|---|---|
| 7,580,862 B1* | 8/2009 | Montelo et al. | 705/26.1 |
| 2003/0005078 A1* | 1/2003 | Turicchi et al. | 709/217 |
| 2003/0041068 A1* | 2/2003 | Camarillo | 707/100 |
| 2007/0083506 A1* | 4/2007 | Liddell et al. | 707/5 |
| 2008/0177770 A1* | 7/2008 | Friedlander et al. | 707/101 |
| 2010/0191619 A1* | 7/2010 | Dicker et al. | 705/27 |

* cited by examiner

*Primary Examiner* — Cam Truong
(74) *Attorney, Agent, or Firm* — Snell & Wilmer L.L.P.

(57) ABSTRACT

A method, system, and machine-readable medium for transforming raw data into business intelligent data that provides a reliable, consistent value and other associated data for the data element is provided. The method includes determining a most frequently occurring value of the data element from a plurality of regulated data sources, determining a value from a highly ranked regulated data source based on a ranking of a plurality of regulated data sources, and determining a value from a highly ranked non-regulated data source based on a ranking of said plurality of non-regulated data sources. The method further arbitrates from among the determined values and stores information regarding the consistency and origin of the arbitrated value.

10 Claims, 5 Drawing Sheets

| Customer | Transunion | Experian | Equifax | Delta | Infobase Consumer Age | Infobase Individual Age | Infobase Individual Age – 2 | Donnelley | Selected Data | Consistency level |
|---|---|---|---|---|---|---|---|---|---|---|
| A | 1966 | 1966 | 1966 | 1966 | | | | 1968 | 1966 | HIGH |
| B | 1966 | 1964 | 1966 | 1964 | 1965 | | 1967 | 1969 | 1966 | HIGH |
| C | | 1966 | 1966 | 1966 | | 1966 | | | 1966 | HIGH |
| D | 1966 | 1967 | 1968 | 1965 | 1964 | | | 1961 | 1966 | MEDIUM |
| E | | 1966 | 1969 | 1966 | | | 1968 | | 1966 | MEDIUM |
| F | | 1966 | | | 1963 | | | | 1966 | MEDIUM |
| G | | | | 1962 | 1966 | | 1963 | 1964 | 1962 | HIGH |
| H | | | | | | | | 1965 | 1966 | LOW |
| I | | | | | | | 1964 | | 1964 | LOW |

*FIG. 5*

METHOD AND SYSTEM FOR DATA ARBITRATION

BACKGROUND

1. Field of the Invention

The present invention relates generally to facilitating selection of a value of a data element and more particularly to methods, systems and machine-readable mediums for arbitrating among values of a data element from regulated and non-regulated data sources.

2. Description of the Related Art

In information sharing and processing environments, many applications have been developed to process information for purposes such as making a decision or evaluating a set of information based on one or more criteria. In many cases, the reliability of these applications is often limited by the ability to reliably acquire accurate information. For example, acquiring accurate customer information is essential for businesses to serve their customers efficiently. The customer information includes, for example, various data elements like demographic information such as postal address, age, year of birth, and customer history such as credit history or purchase history. The evolution of distributed network environments such as the Internet has resulted in an explosion of both the quantity and availability of the customer information from various sources. These data sources can be regulated data sources such as credit bureaus, consumer reporting agencies or non-regulated data sources such as banks, mortgage issuers, credit union lenders, property lease information repositories and customer surveys conducted by various business units. Typically, the regulated data sources are considered more accurate and reliable compared to the non-regulated data sources. However, there is no assurance that the customer information derived from any data source is accurate or reliable. Furthermore, given the large volume of data, it is typically very difficult, time consuming and expensive to verify the accuracy of the data with the customers themselves.

Generally, organizations rely on cumbersome manual assessment of data by their employees to select a value of a data element among those obtained from various data sources. For example, the employees manually select a first value of birth year data of a customer from a first data source, and discard a second value from a second data source if the two data sources contain non-identical values. Some organizations use automated tools to select a value from more than one data source. However, such techniques often fail to consider the reliability of a data source in order to select the most accurate customer information. Similarly, such techniques seldom take into consideration that, while a given data source may generally be deemed to be reliable over a second data source, the second data source may be more reliable for information for certain data elements. For example, a first data source may contain the more accurate customer address data, while a second data source may contain more accurate date of birth data. Thus, when reliability of data is considered at the data source level and not by a data element by data element basis, a less reliable value may be used instead of more reliable data.

Further, other systems usually do not take into account the known reliance on the regulated data sources by many financial institutions. Financial institutions may prefer a value from the regulated data sources such as credit bureaus and consumer rating agencies over the non-regulated data sources such as lenders, creditors and utilities. Additionally, some modern organizations not only require the most reliable data available, but also a qualitative indicator of reliability of the data. For example, a qualitative indicator may be used by a human analyst in risk assessment divisions of an organization to make more informed decisions.

Therefore, a long felt need exists for a method and system that overcomes these and other problems associated with current data arbitration and related data analysis methods. A need exists to select the most reliable value of a data element from multiple values of the data element obtained from multiple data sources.

SUMMARY

A method and system for arbitrating between inconsistent values of a data element is provided. Multiple values of a data element are obtained from regulated data sources and non-regulated data sources. Raw data is transformed into business intelligent data by determining a most reliable value (based on the consistency and reliability of information of the regulated data sources and the non-regulated data sources) and by encoding the arbitrated data with reliability and/or consistency indicators.

In one embodiment, the data arbitration system accesses values of a data element from multiple regulated and non-regulated data sources. The data arbitration system also accesses the rankings assigned to the regulated and non-regulated data sources. The data arbitration system selects the most frequently occurring value of the data element from the regulated data sources. In cases where a value occurring more frequently than others does not exist, the data arbitration system selects the value of the data element from the highest ranked regulated data source. In cases where no values of the data element are available from the regulated data sources, the data arbitration system selects the value of the data element from the highest ranked non-regulated data source.

Thus, a value is determined to be the most reliable value available based on both the ranking of the data sources and the frequency of occurrence of the values in the multiple data sources. An arbitration indicator is determined and associated with the most reliable value.

In one embodiment, the arbitration indicator includes a consistency measure (e.g. a High/Low/Medium consistency measure) which is assigned to the selected value based on, for example, one or more of the occurrence frequency of the value and ranking of the data source from which the value was selected. In one embodiment of the data arbitration system, the regulated data sources and non-regulated data sources are associated with different rankings for different data elements such as "year of birth", "permanent address", "zip code" and the like.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The benefits provided by this invention include, for example, providing organizations with accurate and reliable data, decreasing costs associated with verifying and validating customer data, increasing the ability to design products and promotions for an appropriate subset of customers and decreasing data errors that may result in customer dissatisfaction and/or legal or regulatory issues.

A data source includes a database or other data sources that store data. A data source may be a regulated data source and/or a non-regulated data source. A data element or data field includes a subset of a data source (e.g. a position in a dataset or a column in a database) designed to store a particular type of information.

Customer includes an individual, consumer, group, business, organization, government entity, transaction account issuer or processor (e.g., credit, charge, etc), merchant, consortium of merchants, account holder, charitable organization, software, hardware, and/or any other entity.

Customer information or raw data values (RDVs) includes the value of a data element in a data source. In one embodiment, an RDV is associated with a customer. The data record of the customer may have one or more data elements such as, for example, "year of birth", "permanent address", "zip code" or "age" of the customer. Examples of RDVs include "1965", "123 MAIN STREET, PHOENIX AZ", "40501" or "43" for the "year of birth", "permanent address", "zip code" and "age" data elements, respectively.

The present invention provides a data arbitration system and a method for data arbitration between conflicting instances of RDVs acquired from various regulated data sources and non-regulated data sources. The data arbitration system applies business rules and data analysis techniques to transform raw customer data into business intelligent data.

Figure 1:
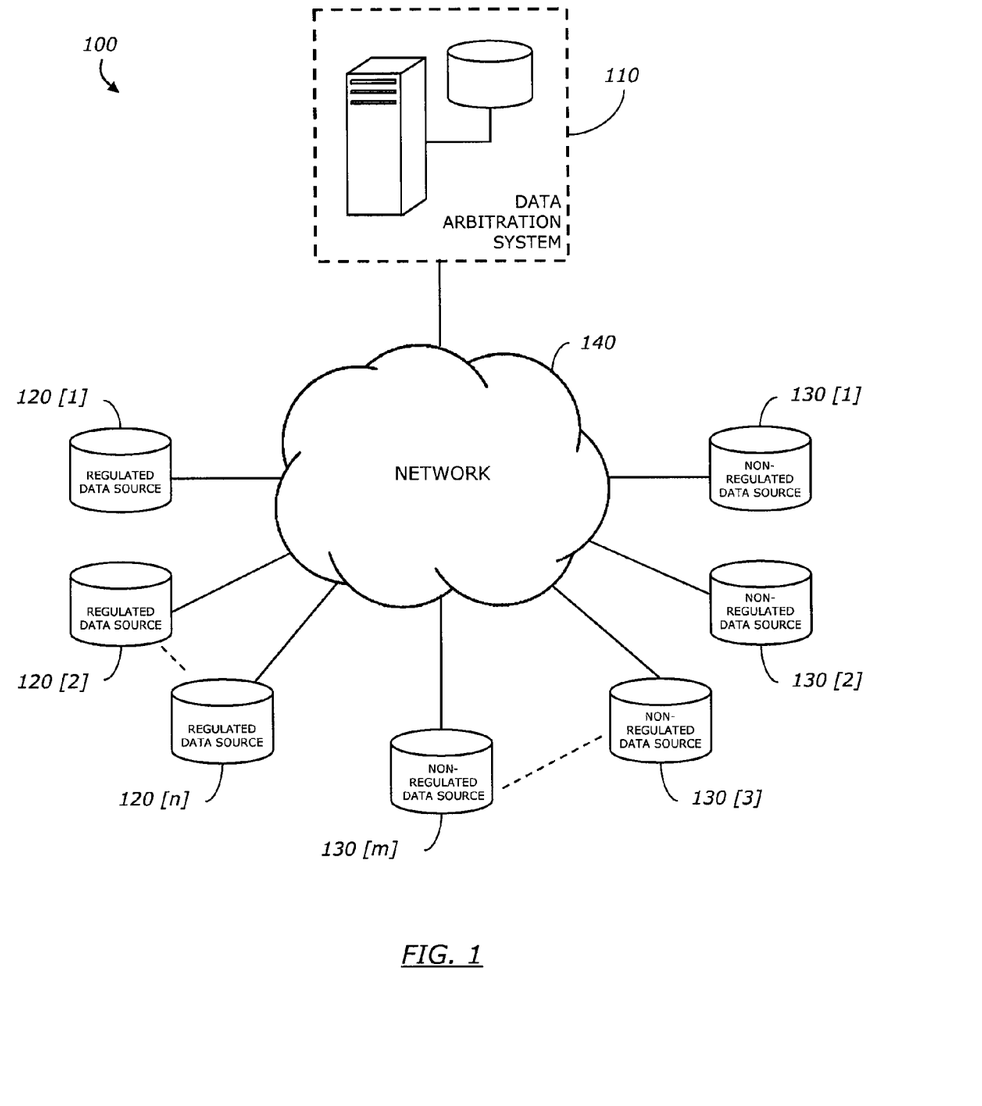
FIG. 1 is a diagram illustrating a representative system for implementing a method for data arbitration between multiple sources, in accordance with one embodiment of the invention.

FIG. 1 illustrates a system 100 for implementing a method for data arbitration between multiple data sources according to an exemplary embodiment of the invention. The system 100 includes a data arbitration system 110, one or more regulated data sources 120 [1], 120 [2], 120 [n], one or more non-regulated data sources 130 [1], 130 [2], 130 [m], and a network 140. The data arbitration system 110 acquires the RDVs from the regulated data sources 120 and non-regulated data sources 130 through the network 140. The data arbitration system 110 arbitrates between the various RDVs obtained for a data element to create arbitrated, reliable data.

One skilled in the art will appreciate that the network 140 may include any system for exchanging data or transacting business, such as the Internet, an intranet, an extranet, Local Area Network (LAN), Wide Area Network (WAN), satellite or wireless communications, and/or the like. In various embodiments, the network 140 is a packet switched network. The packet switched network transmits data in form of segments called packets.

In one embodiment, the data arbitration system 110 may obtain RDVs through secondary storage media such as, for example, optical discs, solid state memory or portable magnetic memory.

The regulated data sources 120 include data sources that are regulated by a governing body or a third party to provide assurance for the accuracy of values of the data elements. In various embodiments, the regulated data sources 120 are credit bureaus that collect and collate personal information, financial data, and/or alternative data on individuals from a variety of sources called data furnishers. The credit bureaus include, for example, TransUnion$^{SM}$, Experian and Equifax®. The data furnishers are typically creditors, lenders, utilities, debt collection agencies and the courts in which a consumer has had proceedings. The data provided by the data furnishers, as well as data collected by the credit bureaus, is aggregated into the credit bureau's database. In the United States, government bodies share responsibility for the oversight of credit bureaus and those that furnish data to them. For instance, the Federal Trade Commission (FTC) has oversight for the credit bureaus while the Office of the Comptroller of the Currency (OCC) charters, and regulates national banks with regard to the data they furnish to the credit bureaus. Those skilled in the art will appreciate that steps of the invention may apply to various regulated data sources of various countries including, without limitation, Experian, Equifax® and Callcredit of the United Kingdom, and the like.

Non-regulated data sources 130 include data sources that are typically not regulated by a governing body or a third party to ensure reliability for the accuracy of values of the data elements included in them. The non-regulated data sources 130 include property lease records, individual mortgage issuers, banks, credit union lenders, and the like. Many organizations rely more on regulated data sources 120 for the values of the data elements. For example, a bank may consider a birth year provided by Equifax® (i.e. a regulated data source) more reliable than a birth year provided by an individual mortgage issuer (i.e. a non-regulated data source). Data from the non-regulated data sources 130 may be used when, for instance, data is not available from any of the regulated data sources 120. A representative data selection process performed by the data arbitration system 110 is explained in conjunction with FIG. 4.

Data arbitration system 110 arbitrates between conflicting RDVs obtained for a data element from various regulated data sources 120 and/or non-regulated data sources 130. Data arbitration system 110 selects the most reliable RDV from the regulated data sources 120 and non-regulated data sources 130. In various embodiments, the most reliable value of the data element may be a value selected from multiple data sources based on rankings provided to the data sources, prior to arbitration between conflicting information at the data arbitration system 110. For example, data arbitration system 110 selects the most consistent value of "year of birth" of a customer from multiple values obtained from various data sources, such as Equifax®, Experian, TransUnion[SM], Delta, etc. A representative implementation of the data arbitration system 110 is explained below in conjunction with FIG. 2. The data arbitration system 110 may be deployed at a service provider that uses the arbitrated customer data directly. Data arbitration system 110 may also be implemented by a third party service provider that provides the arbitrated customer data to other organizations or service providers.

Figure 2:
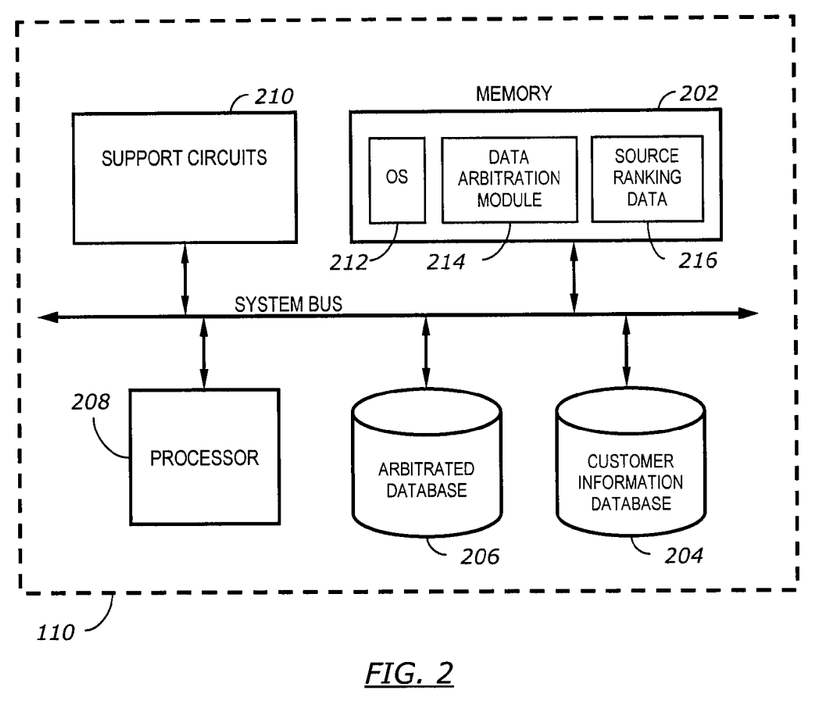
FIG. 2 is a simplified block diagram of a representative data arbitration system illustrated in FIG. 1, in accordance with one embodiment of the invention.

FIG. 2 is a simplified block diagram of an exemplary implementation of the data arbitration system 110. Data arbitration system 110 includes, for example, a memory 202, a customer information database 204, an arbitrated database 206, a processor 208 and support circuits 210. Memory 202 coupled to customer database 204 and arbitrated database 206 includes a plurality of computer readable mediums accessible by processor 208. The plurality of computer readable mediums includes an operating system (OS) 210, a data arbitration module 214 and source ranking data 216. The data arbitration module 214 determines a most reliable value of a data element from the RDVs obtained from the customer database 204 and the source ranking data 216. A person skilled in the art would appreciate that the memory 202 may include dynamic or static random access memory, magnetic or optical data storage disks, or magnetic data storage tapes, and the like. Other processing and memory means, including various computer readable media, may be used for storing and executing program instructions. The OS 210 may comprise various executable application modules. The data source ranking module 212 may be implemented as a machine-readable program code that is executable on the processor 206.

Memory 202 includes Operating System (OS) 212, data arbitration module 214 and source ranking data 216. OS 212 may comprise various executable application modules. Data arbitration module 214 may be implemented as machine-readable program code that is executable on the processor 208. In various embodiments, the data arbitration module 214 may be implemented as a function or sub-routine of a machine-readable program, or as a machine-readable program of a suite of applications. The machine-readable medium is a series of computer instructions that are designed to accomplish a particular result.

Source ranking data 216 includes data about the ranking of the various regulated data sources 120 and non-regulated data sources 130. In various embodiments, the source ranking data 216 includes business rules, parameters and measures of source reliability such as percentage reliability, a numeric value within a specified range, and/or a ratio. The measure of source reliability of a data source may incorporate a consistency assessment or metric associated with the data elements of regulated data sources 120. The source ranking data 216 may be obtained from a machine readable code designed specifically for ranking the data sources, executed on the processor 208. In one embodiment, the machine readable code designed specifically for ranking the data sources is executed on a different processing system. In an embodiment, the source ranking data 216 may be generated in the data arbitration system 110, while in an embodiment the source ranking data 216 may be specified manually by a user. A person skilled in the art will recognize that various parameters and processes may be employed for generating the source ranking data 216, without deviating from the spirit and scope of the present invention.

The teachings of the present invention may be embodied in the form of computer readable program code that is executable on processor 208. Processor 208 executes process steps associated with data arbitration module 214. Processor 208 includes at least one microprocessor or microcontroller. Though a single processor is shown in FIG. 2, a person skilled in the art will recognize that data arbitration system 110 may include multiple processors. Support circuits 210 include well-known circuits that support the operation of processor 208 such as power supplies, clocks, cache, input/output circuits, network cards, and the like. Support circuits 210 include circuitry for communication with the network 140 such as a modem, a router, an Ethernet adaptor, and the like. Support circuits 210 may also include other communication interfaces such as Institute of Electrical and Electronics Engineers (IEEE) 1394, IEEE 802.11 (Wireless LAN), RS232 serial port, or Universal Serial Bus (USB).

Customer information database 204 includes RDVs obtained from regulated data sources 120 and the non-regulated data sources 130. Arbitrated database 206 includes the selected arbitrated values of the RDVs and a consistency level associated with the selected arbitrated values. In one embodiment, the consistency level is a qualitative indication of the extent of agreement of the selected arbitrated value with the other values of the customer information database 204. In one embodiment, the consistency level is a quantitative metric based upon sophisticated data analysis techniques such as statistical analysis, expert judgment, simulation data, forecasting data and/or regression analysis. A representative structure of customer information database 204 and arbitrated database 206 is explained in conjunction with FIG. 5. In an embodiment, the customer information database 204 and the arbitrated database 206 may be implemented as a single database including data fields of both databases, derived data fields, etc. In one embodiment, customer information database 204 and arbitrated database 206 are implemented in memory 202. In an embodiment, customer information database 204 and arbitrated database 206 may be implemented on secondary storage devices such as magnetic discs, optical discs or solid state non-volatile memories. The customer information database 204 and arbitrated database 206 may be implemented using commonly known database management techniques and/or database management software systems including, without limitation, Oracle®, Microsoft® SQL Server, or MySQL®.

Figure 3:
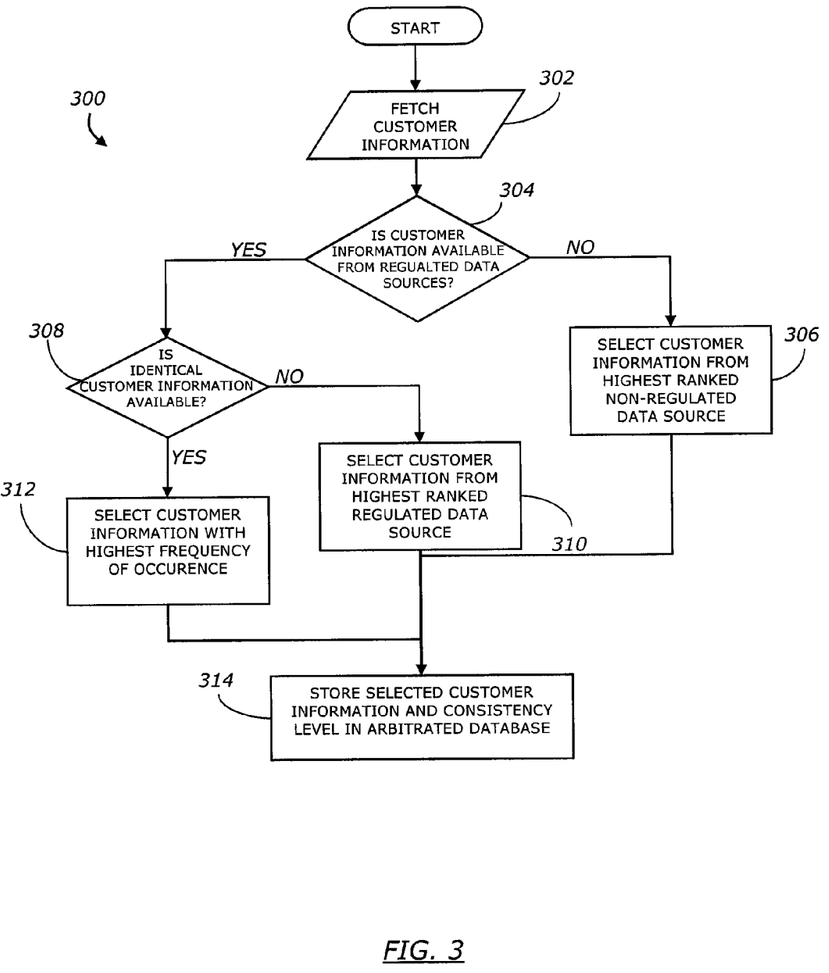
FIG. 3 is a flowchart illustrating a representative implementation of a method for data arbitration between multiple sources, in accordance with one embodiment of the invention.

FIG. 3 is a flowchart illustrating an exemplary implementation of a method 300 for data arbitration between multiple sources. The flowchart illustrates process steps for arbitrating between conflicting RDVs associated with a customer. In one embodiment, the RDV is a numeric value associated with a data element such as the "year of birth" of the customer. In one embodiment, method 300 for data arbitration may be executed for every customer, or for each customer in a subset of customers, sequentially. The method 300 for data arbitration may be executed for each customer individually, as desired. RDVs are obtained from the regulated data sources 120 and the non-regulated data sources 130. The RDVs are stored in the customer information database 204 (step 302).

Data arbitration module 214 checks the customer information database 204 and determines whether an RDV for the data field is available from at least one of the regulated data sources 120 (step 304). In one embodiment, data arbitration module 214 checks for data fields of records obtained from the regulated data sources 120 in the customer information database 204. If a data field corresponding to a regulated data source 120 [$i$, $1 \leq i \leq m$] is null or blank the RDV from the regulated data source 120 [$i$] is determined to be unavailable.

In one embodiment, an RDV is considered unavailable if the RDV is illogical or incomplete (e.g. a birth year occurring in the future or an address without a street number). In various embodiments, data arbitration module 214 determines availability of RDVs for all the regulated data sources 120.

In response to no RDV for the given data field being available from the regulated data sources 120, data arbitration modules 214 check the ranking of non-regulated data sources 130 that have an RDV available, based the source ranking data 216, and selects an RDV from a non-regulated data source 130 [$j$, $1 \leq j \leq n$] with the highest rank (step 306).

In response to an RDV being available from at least one of the regulated data sources 120, the data arbitration module 214 determines whether multiple regulated data sources 120 have identical RDVs for the customer (step 308).

In response to no two regulated data sources being identical RDVs, the data arbitration module 214 selects the RDV from a regulated data source 120 [$k$, $1 \leq k \leq n$] with the highest rank (step 310) based on source ranking data 216. A special case of no two regulated data sources 120 having identical RDVs is, when an RDV is available from only one regulated data source 120 [$l$, $1 \leq l \leq n$]. In this case, the regulated data source 120 [$l$] is the highest ranked available data source according to the source ranking data 216. Thus, the RDV from the regulated data source 120 [$l$] is selected at step 310.

In response to multiple regulated data sources 120 having identical RDVs, the data arbitration module 214 selects the RDV determined to occur most frequently (step 312).

The arbitrated data value is stored in arbitrated database 206 (step 314). In one embodiment, additional data associated with the arbitrated data value is also stored. Such additional data may include, the data source(s) from which the arbitrated data was derived, a consistency indicator, a reliability indicator, the date the data was arbitrated, etc.

The execution of the process steps associated with data arbitration module 214 is described in conjunction with FIG. 4 below.

Figure 4:
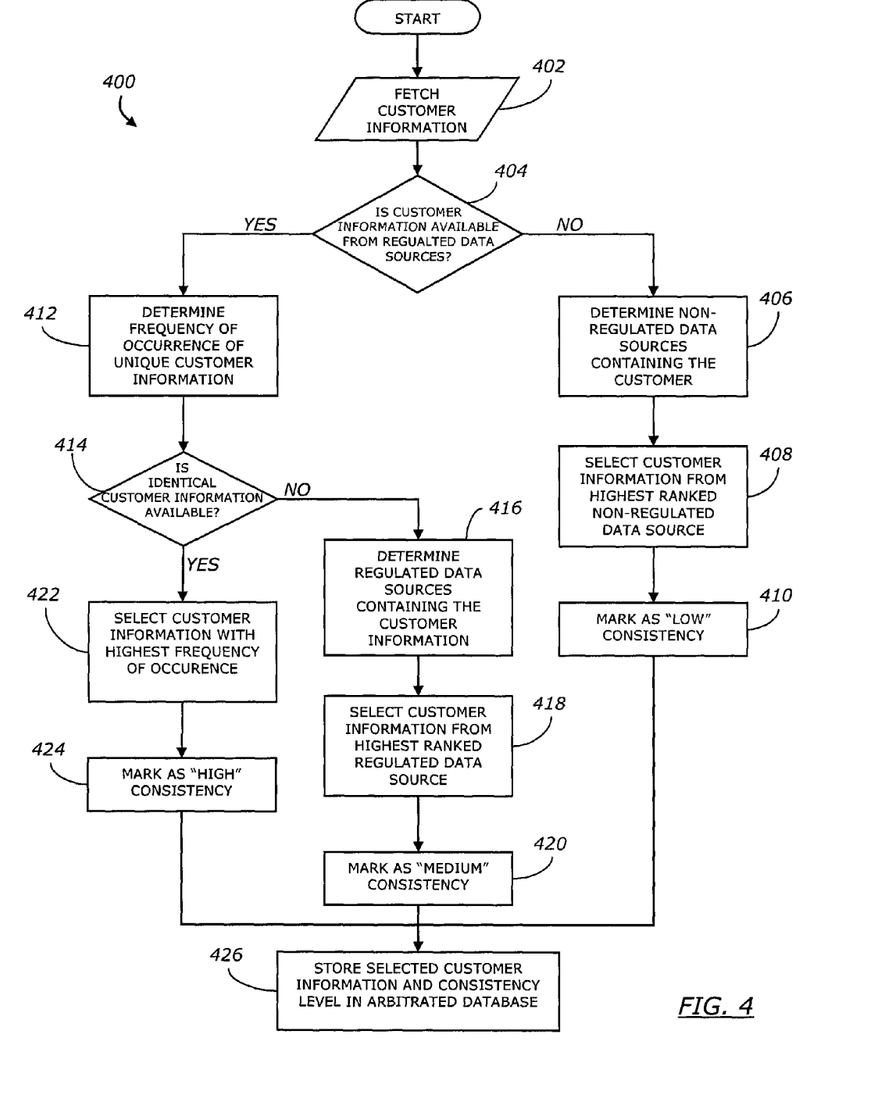
FIG. 4 is a flowchart illustrating a representative implementation of a method for data arbitration between multiple sources, in accordance with one embodiment of the invention.

FIG. 4 is a flowchart illustrating an exemplary implementation of a method 400 for data arbitration between multiple sources. The flowchart illustrates process steps for arbitrating between conflicting RDVs pertaining to one customer. In one embodiment, the RDV is a numeric value such as the "year of birth" of the customer. Method 400 for data arbitration may be executed for every customer, or for each customer in a subset of customers, sequentially. The method 400 for data arbitration may be executed for a customer individually, as desired. RDVs are obtained from regulated data sources 120 and non-regulated data sources 130. The RDVs are stored in customer information database 204 (step 402).

Data arbitration module 214 checks customer information database 204 and determines whether an RDV is available from at least one of the regulated data sources 120 (step 404). In one embodiment, data arbitration module 214 checks for data fields of records obtained from the regulated data sources 120 in customer information database 204. If the RDV corresponding to a regulated data source 120 [$i$, $1 \leq i \leq m$] is blank or null, the RDV from the regulated data source 120 [$i$] is determined to be unavailable. In one embodiment, an RDV is considered unavailable if the RDV is illogical or incomplete. In an embodiment, data arbitration module 214 determines availability of the RDVs for all the regulated data sources 120.

On determination that RDVs are unavailable in all regulated data sources 120, data arbitration module 214 determines non-regulated data sources 130 from which RDVs are available (step 406). Data arbitration modules 214 check the ranking of non-regulated data sources 130 that have RDVs available, based the source ranking data 216, and selects the RDV from a non-regulated data source 130 [$j$, $1 \leq j \leq n$] with the highest rank (step 408). A consistency level is assigned to the selected RDV (step 410). In one embodiment, a pre-determined consistency level indicates consistency of non-regulated data source 130 [$j$] with regulated data sources 120. In various embodiments, source ranking data 216 stores the pre-determined consistency level for the non-regulated data source 130 [$j$].

In response to an RDV being available in at least one of the regulated data sources 120, the data arbitration module 214 determines the frequency of occurrence of each unique RDV from the regulated data sources 120 (step 412). The data arbitration module 214 analyzes the frequency of occurrence obtained in step 412, and determines whether multiple regulated data sources 120 have identical RDVs for the customer (step 414).

In response to two regulated data sources 120 having identical RDVs for the customer, the data arbitration module 214 determines availability of the RDVs in all the regulated data sources 120, and checks the ranking of regulated data sources 120, based on the source ranking data 216 (step 416). Based on the rankings of the regulated data sources 120, data arbitration module 214 selects the RDV from a regulated data source 120 [$k$, $1 \leq k \leq n$] with the highest rank (step 418). A pre-determined or calculated consistency level is assigned to the selected RDV (step 420). In one embodiment, a "Medium" consistency level is assigned. A special case of no two regulated data sources 120 having identical RDVs is, when the RDV is available from only one regulated data source 120 [$l$, $1 \leq l \leq n$]. In this case, the regulated data source 120 [$l$] is the highest ranked available data source according to the source ranking data 216. Thus, the RDV from the regulated data source 120 [$l$] is selected at step 418. For this case also, at step 420, a pre-determined consistency level is assigned to the selected RDV. In one embodiment, a "Medium" consistency level is assigned.

In response to multiple regulated data sources 120 having identical RDVs, data arbitration module 214 compares the frequency of occurrence obtained in step 412 and determines which RDV occurs most frequently. The RDV determined to occur most frequently is selected (step 422). A pre-determined consistency level is assigned to the selected RDV (step 424). In one embodiment, a "High" consistency level is assigned.

The RDVs in the process described is a numeric value. However, a person skilled in the art will recognize that data arbitration system 110 and data arbitration module 214 may be used to arbitrate between text values such as customer address, customer name, and the likes. However, suitable text processing may be desired to determine whether RDVs from multiple sources are equivalent or different. Such text processing may include, for example, parsing the RDV into words and/or characters, analyzing white spaces and punctuation marks, generating keywords for comparison and analyzing occurrence of keywords. Various text comparison software is also available. Such software may be configured for use with data arbitration module 214.

The consistency levels assigned to the selected RDV in steps 410, 420, and 424 are indicative of a qualitative value of the selected RDV. In an embodiment, the consistency levels may be "High", "Medium" or "Low". Consistency levels provide an estimate of the agreement of the selected RDV with all available RDVs in the various data sources. In one embodiment, consistency levels are used by a human operator to assess the value of the selected RDV. Consistency levels may be used to mark the particular customer for further verification of the data. For example, a selected "year of birth" of a customer assigned with a "Low" consistency level may be used by customer service representatives of the organization to verify directly with the customer the correct "year of birth". A person skilled in the art will appreciate that there may be other methods for verification, apart from a simple logic to assign consistency levels. In another embodiment, more complex decision making techniques such as fuzzy logic may be employed to determine and/or assign the consistency levels. Such techniques may use various parameters such as, for example, the data source from which the RDV was selected, or which of the other data sources have the same information as the selected RDV.

The selected RDV and the assigned consistency levels are stored in arbitrated database 206 (step 426). A person skilled in the art will appreciate that arbitrated customer data (i.e. the selected RDVs and the assigned consistency levels) may be stored in a single database along with customer information from the regulated data sources 120 and the non-regulated data sources 130.

Figure 5:
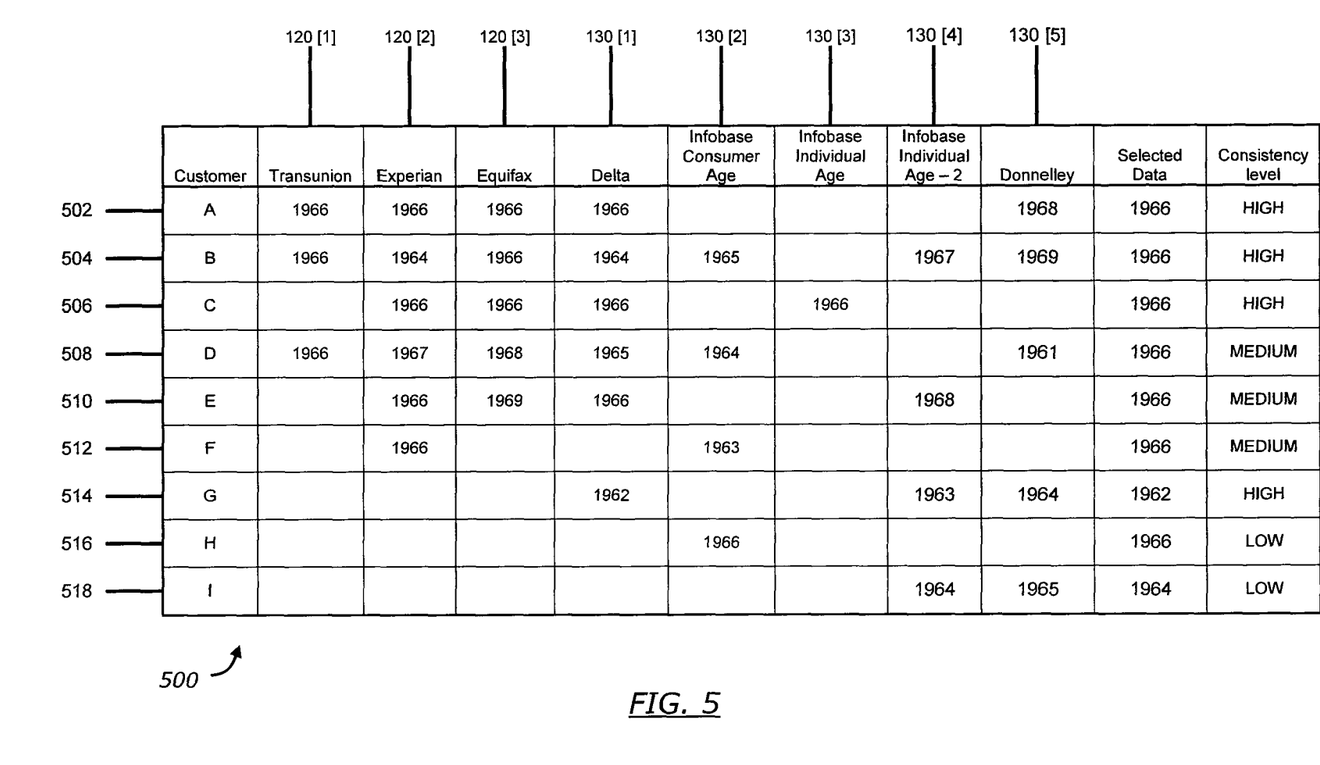
FIG. 5 is a diagram of tables of a representative data arbitration system illustrating arbitration between various data sources, in accordance with one embodiment of the invention.

FIG. 5 illustrates an exemplary structure 500 of the customer information database 204 and arbitrated database 206. FIG. 5 is table of an exemplary data arbitration system illustrating arbitration between various data sources in accordance with one embodiment of the invention. FIG. 5 shows "year of birth" information stored in customer information database 204, obtained from three exemplary regulated data sources TransUnion$^{SM}$, Experian and Equifax®, and five exemplary non-regulated data sources Delta, Infobase customer age, Infobase Individual Age, Infobase Individual Age 2yr inc and Donnelley consumer age, and the selected RDV and assigned consistency level stored in arbitrated database 206.

Records 502-510 are exemplary records illustrating the availability of "year of birth" information from multiple regulated data sources 120. Records 502, 504 and 506 are exemplary records illustrating multiple regulated data sources 120 having the same "year of birth" information. Record 502 illustrates TransUnion$^{SM}$, Experian and Equifax® having identical "year of birth" information. Record 504 illustrates Trans Union$^{SM}$ and Equifax® having identical "year of birth" information. Record 506 illustrates Experian and Equifax® having identical "year of birth" information. For these records, the most frequently occurring "year of birth" information is selected in accordance with step 422. The selected "year of birth" information is assigned a "High" consistency level in accordance with step 424.

Records 508 and 510 are exemplary records illustrating the case of no two regulated data sources 120 having the same "year of birth" information. For these records, "year of birth" information is selected from a highest ranked regulated data source 120 [1] or 120 [2] or 120 [3] for which "year of birth" information is available, in accordance with step 418. The selected "year of birth" information is assigned a "Medium" consistency level in accordance with step 420. Record 512 is an exemplary record illustrating the availability of "year of birth" information from only one of the regulated data sources, namely 120 [2]. As described above, in conjunction with FIG. 4, this is a special case of no two regulated data sources 120 having the same "year of birth" information. For this record, "year of birth" information from the highest ranked regulated data source 120 [2] i.e. Experian, is the only available "year of birth" information from any regulated data sources 120. Thus, the "year of birth" RDV available from Experian is selected in accordance with step 418. The selected "year of birth" RDV is associated with a "Medium" consistency level in accordance with step 420.

Records 514-518 are exemplary records illustrating the unavailability of "year of birth" RDVs from any of the regulated data sources 120. "Year of birth" RDVs are available only from the non-regulated data sources 130. For these records, "year of birth" information is selected from a highest ranked non-regulated data source 130 [$q$, $1 \leq q \leq n$] for which "year of birth" RDVs are available, in accordance with step 408. Data arbitration module 214 selects "1962" from Delta for record 514, "1966" from Infobase Customer Age for record 516 and "1964" from Infobase Individual Age-2 for record 518. At step 410, a pre-determined consistency level is assigned indicative of the consistency of the non-regulated data source 130 with all the regulated data sources 120. For example, Delta may have more than 90% consistency with the regulated data sources 120 and hence the "year of birth" RDV selected from Delta is assigned a "High" consistency level. Infobase Customer Age and Infobase Individual Age-2 may have about 30% consistency with the regulated data sources 120. Hence a "Low" consistency level is assigned to RDVs selected from these two.

In one embodiment, the present invention enables standardization of business logic across various business units. Different business units may desire different customer data for different purposes. For example, a marketing and promotion unit may desire customer age or purchase history of customers for generating targeted marketing campaigns. On the other hand, the loans and mortgages unit may require customer credit history, average income and sources of income of customers for analyzing risk in offering loans. All business units can use the present invention, with a parameter set according to their desires. For example, different data sources may have different accuracies in different geographic locations, for example Equifax® of Atlanta, Ga. may present a more accurate data of the Eastern states of the United States while Experian of CA may present a more accurate data of the Western states, or different accuracies in different demographic groups, for example property lease information repositories may present more accurate data for customers aged 30 and above, but not for customers aged between 25 and 30. Thus, a marketing unit for the Western states may prefer Experian over other data sources, whereas a loans and mortgages unit may prefer property lease information repositories over other data sources.

An embodiment of the present invention selects the most reliable RDV from multiple conflicting values from various data sources, without discarding any information. Further, a consistency level is assigned to the selected RDV to enrich the business intelligence of the data. Thus, there is a systematic increase in the quantity of information. The selected RDVs and assigned consistency levels may be used in subsequent data arbitration cycles to improve reliability and accuracy of customer information.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), with the various algorithms being implemented with any combination of information structures, objects, processes, routines or other programming elements. Further, it should be noted that the present invention may employ any number of conventional techniques for information transmission, signaling, information processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schreier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference for background purposes.

It will be appreciated, that many applications of the present invention could be formulated. One skilled in the art will appreciate that the network may include any system for exchanging information or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

It should be appreciated that the particular implementations shown and described herein are illustrative of the invention and its best mode and are not intended to otherwise limit the scope of the present invention in any way. Indeed, for the sake of brevity, conventional information networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, an information processing system, a device for information processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable information processing apparatus to produce a machine, such that the instructions which execute on the computer or other programmable information processing apparatus create means for implementing the functions specified in the flowchart block or blocks.

These computer program instructions may also be stored in a computer-readable memory that can direct a computer or other programmable information processing apparatus to function in a particular manner, such that the instructions stored in the computer-readable memory produce an article of manufacture including instruction means which implement the function specified in the flowchart block or blocks. The computer program instructions may also be loaded onto a computer or other programmable information processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The invention has been described with reference to specific embodiments. It will be appreciated, however, that various modifications and changes can be made without departing from the scope of the present invention. The specification and figures are to be regarded in an illustrative manner, rather than a restrictive one, and all such modifications are intended to be included within the scope of present invention. For example, the steps recited in any of the method or process claims may be executed in any order and are not limited to the order presented.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims. While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, when a phrase similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method, comprising:
    accessing, by a computer configured for data arbitration, multiple raw data values of a data element from a plurality of regulated data sources and a plurality of non-regulated data sources;
    converting said multiple raw data values of said data element into a common format of said data element;
    determining, by said computer, a first raw data value as a most frequently occurring raw data value (RDV) of said data element in said plurality of regulated data sources;
    determining, by said computer and in response to determining said first RDV to be unavailable, a second RDV value from one of said plurality of regulated data sources based on a ranking of said plurality of regulated data sources;
    determining, by said computer and in response to determining said first RDV to be unavailable and said second RDV to be unavailable, a third RDV from one of said plurality of non-regulated data sources based on a ranking of said plurality of non-regulated data sources;
    wherein said determining said first RDV to be unavailable comprises determining said first RDV to be at least one of blank, null, empt7, inaccurate or incomplete, and wherein said determining said second RDV to be unavailable comprises determining said second RDV to be at least one of blank, null, empty, inaccurate or incomplete;
    storing, by said computer, at least one of said first RDV, said second RDV, or said third RDV as an arbitrated data value;
    determining, by said computer, an arbitration indicator, wherein said determining said arbitration indicator comprises assigning a consistency level based on at least one of occurrence frequency in said plurality of regulated data sources, said ranking of said plurality of regulated data sources, or said ranking of said plurality of non-regulated data sources, wherein said consistency level comprises one of: high consistency, medium consistency and low consistency; and
    associating, by said computer, said arbitrated data value with said arbitration indicator.

2. The method of claim 1, wherein said ranking of said plurality of regulated data sources and said ranking of said plurality of non-regulated data sources are based on at least one of: accuracy, reliability or consistency of said plurality of regulated data sources and said plurality of non-regulated data sources.

3. The method of claim 1, wherein said data element comprises numeric data.

4. The method of claim 1, further comprising accessing said ranking of said plurality of regulated data sources and said ranking of said plurality of non-regulated data sources.

5. The method of claim 1, wherein at least one of said ranking of said plurality of regulated data sources or said ranking of said plurality of non-regulated data sources is based upon the ranking of the data element within the respective data sources.

6. The method of claim 1, wherein at least one of said ranking of said plurality of regulated data sources, said ranking of said plurality of non-regulated data sources or said arbitration indicator is based upon at least one of statistical analysis, regression analysis, forecasting analysis, expert assessment or simulation analysis.

7. The method of claim 1, wherein said arbitration indicator comprises an indicator of a data source from which the arbitrated data value was derived.

8. The method of claim 1, wherein said plurality of regulated data sources and said plurality of non-regulated data sources comprise data associated with individual consumers.

9. A non-transitory computer-readable medium having stored thereon a plurality of instructions, the plurality of instructions including instructions which, in response to execution by a computer system configured for data arbitration, cause said computer system to perform operations comprising:
    accessing, by said computer system, multiple raw data values of a data element from a plurality of regulated data sources and a plurality of non-regulated data sources;
    converting said multiple raw data values of said data element into a common format of said data element;
    determining, by said computer system, a first raw data value as a most frequently occurring raw data value (RDV) of said data element in said plurality of regulated data sources;
    determining, by said computer system and in response to determining said first RDV to be unavailable, a second RDV value from one of said plurality of regulated data sources based on a ranking of said plurality of regulated data sources;
    determining, by said computer system and in response to determining said first RDV to be unavailable and said second RDV to be unavailable, a third RDV from one of said plurality of non-regulated data sources based on a ranking of said plurality of non-regulated data sources;
    wherein said determining said first RDV to be unavailable comprises determining said first RDV to be at least one of blank, null, empty, inaccurate or incomplete, and
    wherein said determining said second RDV to be unavailable comprises determining said second RDV to be at least one of blank, null, empty, inaccurate or incomplete;

storing, by said computer system, at least one of said first RDV, said second RDV, or said third RDV as an arbitrated data value;

determining, by said computer system, an arbitration indicator, wherein said determining said arbitration indicator comprises assigning a consistency level based on at least one of occurrence frequency in said plurality of regulated data sources, said ranking of said plurality of regulated data sources, or said ranking of said plurality of non-regulated data sources, wherein said consistency level comprises one of: high consistency, medium consistency and low consistency; and, associating, by said computer system, said arbitrated data value with said arbitration indicator.

10. A system, comprising:

a memory for storing a computer program; and a processor configured for data arbitration, said processor coupled to said memory for executing said computer program, wherein said computer program is configured to perform operations comprising: accessing, by said processor, multiple raw data values of a data element from a plurality of regulated data sources and a plurality of non-regulated data sources;

converting said multiple raw data values of said data element into a common format of said data element;

determining, by said processor, a first raw data value as a most frequently occurring raw data value (RDV) of said data element in said plurality of regulated data sources;

determining, by said processor and in response to determining said first RDV to be unavailable, a second RDV value from one of said plurality of regulated data sources based on a ranking of said plurality of regulated data sources;

determining, by said processor and in response to determining said first RDV to be unavailable and said second RDV to be unavailable, a third RDV from one of said plurality of non-regulated data sources based on a ranking of said plurality of non-regulated data sources;

wherein said determining said first RDV to be unavailable comprises determining said first RDV to be at least one of blank, null, empty, inaccurate or incomplete, and wherein said determining said second RDV to be unavailable comprises determining said second RDV to be at least one of blank, null, empty, inaccurate or incomplete;

storing, by said processor, at least one of said first RDV, said second RDV, or said third RDV as an arbitrated data value;

determining, by said processor, an arbitration indicator, wherein said determining said arbitration indicator comprises assigning a consistency level based on at least one of occurrence frequency in said plurality of regulated data sources, said ranking of said plurality of regulated data sources, or said ranking of said plurality of non-regulated data sources, wherein said consistency level comprises one of: high consistency, medium consistency and low consistency; and associating, by said processor, said arbitrated data value with said arbitration indicator.

\* \* \* \* \*